United States Patent
Yoshino et al.

(10) Patent No.: US 7,878,579 B2
(45) Date of Patent: Feb. 1, 2011

(54) VEHICLE FRONT END ASSEMBLY AND METHOD

(75) Inventors: Hiroshi Yoshino, Dublin, OH (US); John E. Werling, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 12/256,264

(22) Filed: Oct. 22, 2008

(65) Prior Publication Data

US 2010/0096886 A1    Apr. 22, 2010

(51) Int. Cl.
*B60N 99/00* (2006.01)

(52) U.S. Cl. ............. 296/198; 296/187.09; 296/193.09

(58) Field of Classification Search ............ 296/187.09, 296/193.09, 198
See application file for complete search history.

(56) References Cited

U.S. PATENT DOCUMENTS

| | | | |
|---|---|---|---|
| 6,237,990 | B1 | 5/2001 | Barbier et al. |
| 6,672,652 | B2 * | 1/2004 | Takeuchi et al. ....... 296/193.09 |
| 7,097,239 | B2 | 8/2006 | Lazzeroni |
| 2003/0085591 | A1 | 5/2003 | Seksaria et al. |
| 2004/0007901 | A1 | 1/2004 | Weik et al. |
| 2005/0134092 | A1 | 6/2005 | Lazzeroni |
| 2005/0242625 | A1 | 11/2005 | Hafner et al. |
| 2007/0182212 | A1 | 8/2007 | Roux et al. |
| 2008/0018137 | A1 | 1/2008 | Troton |

FOREIGN PATENT DOCUMENTS

| | | |
|---|---|---|
| DE | 100 31 372 A1 | 1/2002 |
| EP | 1 336 551 A2 | 8/2003 |
| EP | 1 544 035 A1 | 6/2005 |
| FR | 2 894 542 A1 | 6/2007 |
| JP | 63101177 | 5/1988 |
| JP | 2005-29120 A | 2/2005 |
| JP | 2005-335500 A | 12/2005 |
| JP | 2007091000 | 4/2007 |
| JP | 2007296883 | 11/2007 |

OTHER PUBLICATIONS

International Search Report for PCT/US2009/061450 dated Feb. 4, 2010.

* cited by examiner

*Primary Examiner*—Lori L Lyjak
(74) *Attorney, Agent, or Firm*—Kenealy Vaidya LLP

(57) ABSTRACT

A front end assembly of a vehicle can include a frame member, a headlight assembly, a fender panel, and a stay. The fender panel includes a nose extending along and above the headlight assembly. The stay is secured to the frame member and includes an abutment surface spaced from an inner surface of the fender nose by a gap. The stay transfers an external force applied to the fender nose to the frame member when the nose is deflected into contact with the stay to limit deflection of the fender nose.

20 Claims, 3 Drawing Sheets

VEHICLE FRONT END ASSEMBLY AND METHOD

BACKGROUND

1. Field

The presently disclosed subject matter relates to devices, systems, and processes useful for enhancing the rigidity of a vehicle body panel.

2. Description of the Related Art

Existing vehicles sometimes include a frame structure onto which body panels are fastened. The frame structure provides structural integrity for the vehicle, and the body panels can define an aesthetic outer surface of the vehicle. Conventional body panels have been formed from a thin sheet of metal, plastic, and/or composite material.

One characteristic of these conventional body panels is that they are sometimes easily deflected or deformed by a person leaning or pushing on the body panel or by a minor impact force from an object striking the body panel. If the body panel is easily deflected and/or deformed, the perceived quality of the vehicle may be deemed unsatisfactory. Similarly, unwarranted repair costs may result from a body panel that is easily deflected or deformed to its plastic limits. In particular, repair and/or replacement may be required due to an incidental loading caused by pushing, leaning or an object impacting the body panel.

Conventional body panels have been stiffened with one or more structural members secured to the inner surface of the body panel by rivets, bolts, welds, adhesives, etc., to prevent minor deflection or deformation of the body panel. This approach, however, complicates manufacturing requiring additional capital investment for tooling and increasing assembly time, and can increase vehicle weight.

However, the rigidity of the body panel should not be made absolute. The ability to provide a certain amount of energy absorption should be present at the body panel. For example, the rigidity of the body panel and any attached structural members should be sufficient to resist minor force inputs without excessive deflection and/or deformation while also being designed to deflect and deform to absorb energy during crash events.

Known vehicle front ends include headlight assemblies that curve or wrap from the front of the vehicle to the sides. The fenders of such vehicles can include forwardly-located nose portions that extend along and over a portion of the headlight assemblies. As a result, such fender nose portions are subject to undesirable deflections under minor loading (e.g., from a person leaning on the nose portion). It is known to include support members secured to the headlight assemblies beneath such fender nose portions to limit the deflection of the fender nose portions. Loads transferred directly to the headlight assemblies from such fender support members, however, can undesirably stress the headlight assemblies. For example, flexing of the headlight assembly adjacent the connection location for the support member can result in failure of the headlight lens seal, typically a glue joint extending in a seal track defined between the headlight lens and the headlight housing.

Accordingly, it is desirable to enhance the rigidity of a body panel to resist minor deflection/deformation without significant negative impact on assembly, weight, or cost considerations and without damaging loading of other vehicle components.

SUMMARY

According to one aspect of the disclosure a front end assembly of a vehicle can include a frame member, a headlight assembly, a fender panel, and a stay. The headlight assembly can be secured to and extend away from the frame member. The fender panel can include a main body, a nose, and an inner surface. The main body can extend along and be secured to the frame member. The nose can extend from the main body, can be spaced and detached from the frame member, and can extend along and above the headlight assembly. The inner surface can extend along at least the nose portion and can face the frame member. The stay can be secured to the frame member at a position on the frame member that is spaced from the main body, can be secured to the headlight assembly, can extend from the frame member toward the inside surface, and can be spaced from the inner surface by a gap. The stay can transfer to the frame member an external force applied to the nose when the inner surface is displaced through the gap and into engagement with the stay by the external force to limit at least one of a deflection and a deformation of the nose when the external force is applied to the nose.

According to an aspect of the disclosed subject matter, a method for supporting a fender on a front end of a vehicle can include: provide a frame, a fender that includes a nose, a headlight assembly, and a stay; secure the fender to the frame such that the nose is spaced from the frame; secure the headlight assembly to the frame adjacent to the space between the frame and the nose; space the stay from the nose by a gap; secure the stay to each of the fender and the headlight when the stay is spaced by the gap; and displace, by an external force, the nose through the gap and into contact with the stay; and transfer the external force through the stay and into the frame when the nose contacts the stay.

According to yet another aspect of the disclosed subject matter, a method for assembling a front end of a vehicle can include: provide a frame, a fender that includes main portion and a nose portion that extends from the main portion, a headlight assembly, and a stay; secure the main portion to the frame with the nose portion spaced from the frame by a distance; connect the headlight assembly to the frame to extend adjacent to the space between the frame and the nose portion and to extend along and below the nose portion; space the stay from the nose by a gap that is substantially less than the distance from the nose to the frame; and secure the stay to each of the frame member and the headlight assembly when the stay is spaced by the gap.

According to another aspect of the disclosed subject matter, a fender assembly for a vehicle can include a fender including a main body and a nose portion, the main body secured to a frame of the vehicle, the nose portion extending from the main body along and above a headlight assembly of the vehicle. The fender assembly for a vehicle can also include a fender support member including an abutment surface arranged for contact with the fender nose portion when the fender nose portion is deflected under external loading, the fender support member including a main body secured to the vehicle frame at a main attachment location to transfer load applied to the fender nose portion to the vehicle frame such that deflection of the nose portion is limited.

BRIEF DESCRIPTION OF THE DRAWINGS

The disclosed subject matter will now be described in more detail with reference to exemplary embodiments of the apparatus and method, given by way of example, and with reference to the accompanying drawings, in which.

DETAILED DESCRIPTION OF EXEMPLARY EMBODIMENTS

Figure 1:
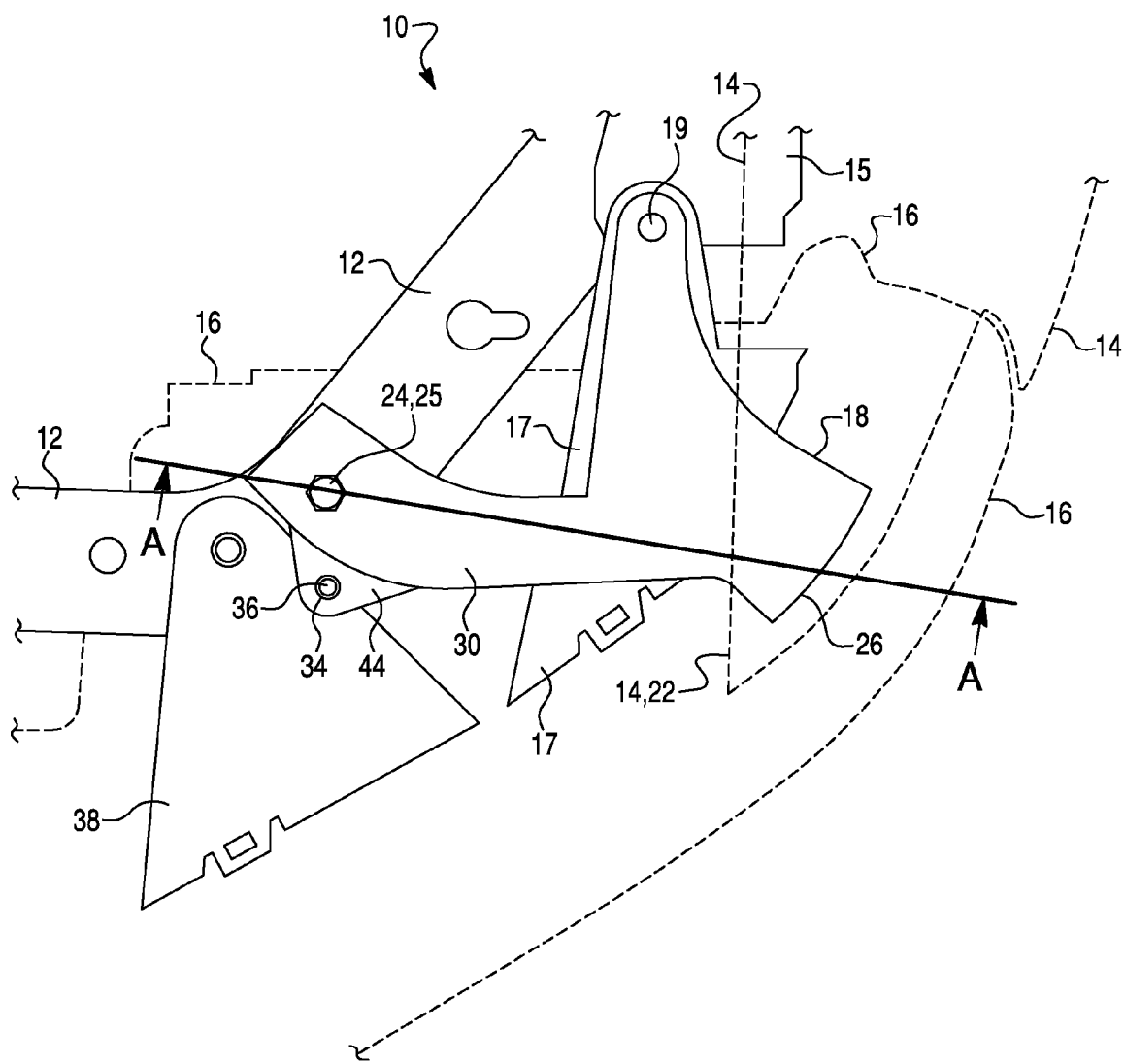
FIG. 1 is a plan view of a portion of a vehicle front end made in accordance with principles of the disclosed subject matter.

FIG. 1 illustrates an embodiment of a vehicle front end 10 made in accordance with principles of the disclosed subject matter. FIG. 1 illustrates a left-side or U.S. driver-side portion of the vehicle front end 10. A right-side portion of the vehicle front end 10 can be configured as a mirror image of the left-side portion and is not further described or illustrated in the drawing figures.

Figure 2:
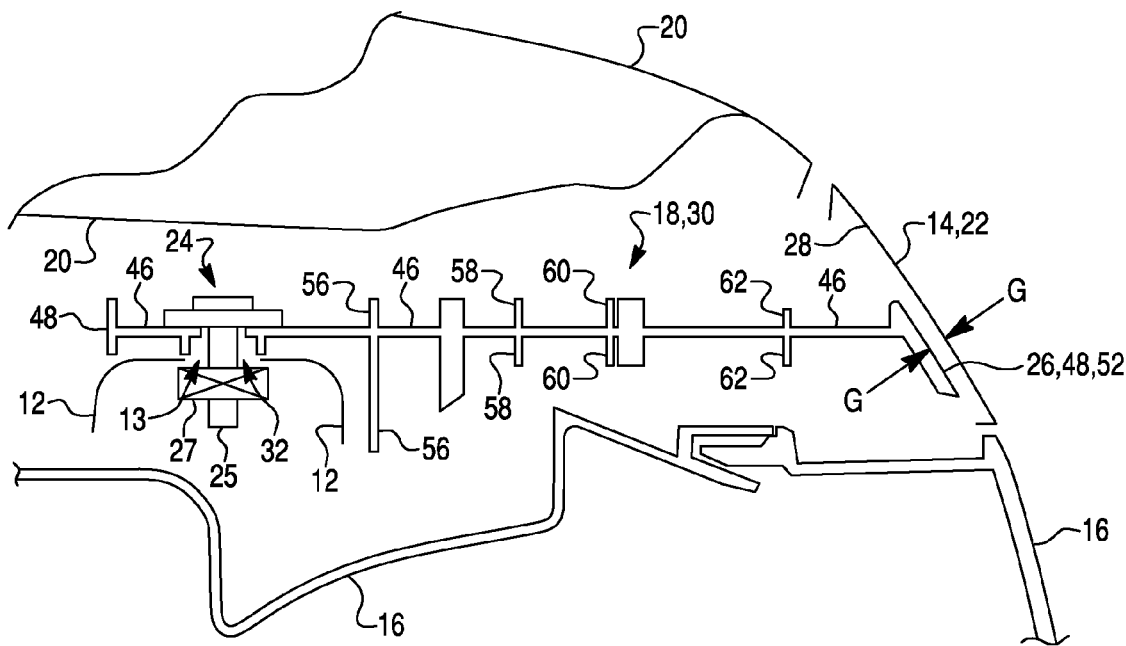
FIG. 2 is a cross-sectional view taken along line A-A of FIG. 1.

Referring to FIGS. 1 and 2, the front end 10 can include a frame member 12, a fender panel 14, a headlight assembly 16, and a fender support member such as stay 18. The fender panel 14 and the headlight assembly 16 are shown in phantom in FIG. 1, for clarity. A hood 20 of the front end 10 is omitted from FIG. 1 for clarity. The fender panel 14 can define an aesthetic outer surface of the vehicle that extends from the A-pillar (not shown) to the bumper (not shown) and below the hood 20 (FIG. 2, only). The headlight assembly 16 can extend along the front of the vehicle and can wrap around the left front corner of the vehicle such that a portion of the headlight assembly 16 extends along the outer side of the vehicle at a position downwardly spaced from the hood 20 and substantially (exactly or almost) co-planar with outer surface of the fender panel 14.

A nose 22 of the fender panel 14 can extend between the hood 20 and at least a portion of the headlight assembly 16. The nose 22 can be spaced from frame member 12 such that the frame member 12 cannot directly limit deflection and/or deformation of the nose 22 if a person pushes or leans on the nose 22 in a directions generally downward and/or toward the frame member 12, or if an object impacts the nose 22 with a minor force in these same directions.

The stay 18 can be secured to the frame member 12 by any suitable method and can be configured and dimensioned to extend from the frame member 12 toward the nose 22 such that the stay 18 can sufficiently limit the deflection and/or deformation of the nose 22 of the fender panel 14. In the embodiment illustrated in FIGS. 1 and 2, the stay 12 can be secured to the frame member 12 by a fastener assembly 24.

With reference to FIG. 2, the stay 18 can include an abutment surface 26 that can be spaced from, but in close proximity to, the inner surface 28 of the nose 22. A force applied to the nose 22 can displace the nose 22 into or through the gap (indicated by arrows G) between the inner surface 28 and the abutment surface 26 and ultimately into contact with the abutment surface 26. The gap G can be dimensioned to permit a small, elastic deflection of the nose 22 while preventing a larger undesirable deflection and/or deformation of the nose 22. The amount of undesirable deflection can also be within or well within the elastic range of deflection of the nose 22. By way of example only, the gap G can be approximately equal to 3.7 mm.

The abutment surface 26 of the stay 18 defines a first area, and the inner surface of the nose 22 of the fender 14 defines a second area. The entire area of the abutment surface can be configured to extend substantially parallel to at least a portion of the second area of the inner surface of the nose 22 to provide consistent support during an elastic deformation of the nose 22 towards the stay 18. The ratio of the first and second areas can vary between 5% and 100%. In particular, the first area of the abutment surface can be configured to be at least 10% of the second area of the nose 22 to provide adequate support to the nose 22 during deflection. Of course, higher ratios (e.g., 20-40% or higher) could provide more support, but would be more expensive to manufacture and take up more room in the vehicle. The particular ratio can be determined depending on various factors when designing a particular vehicle.

For the purpose of defining the areas, the second area of the nose 22 can be considered to be bound by only that portion of the fender 14 that extends above and along the headlight assembly 16 in the vehicle. The first area of the abutment surface 26 can be considered the full extent of the abutment surface 26 that runs substantially parallel with the inner surface of the nose 22.

Figure 3:
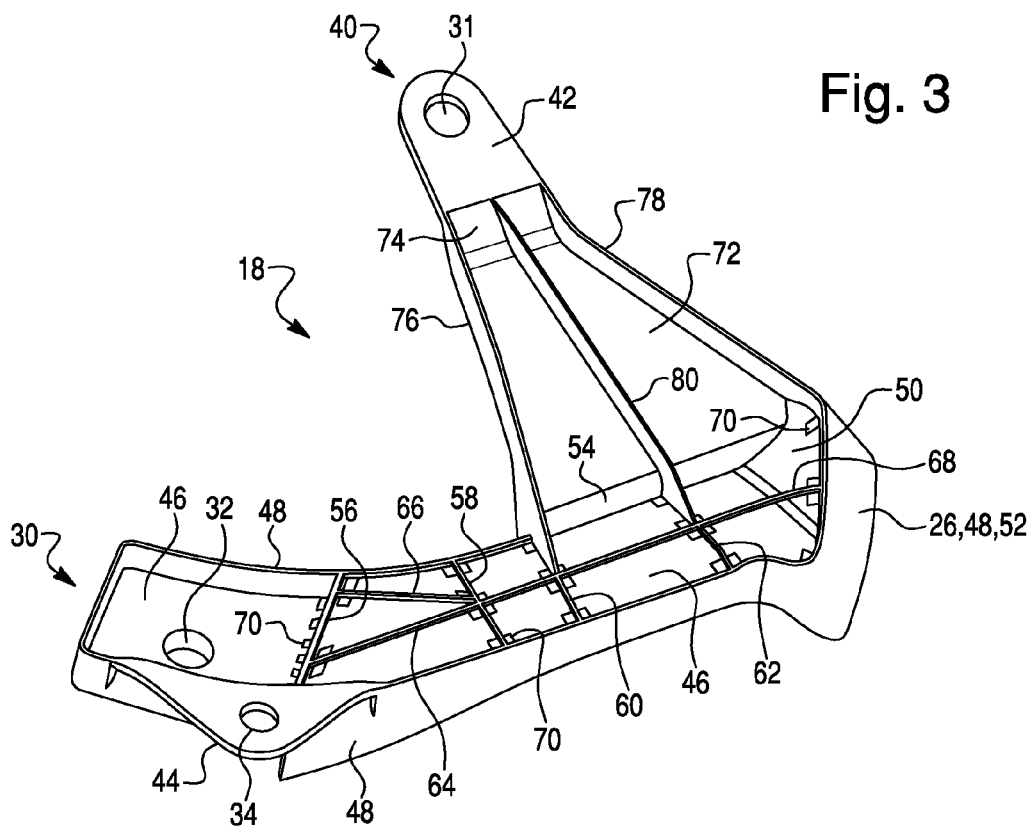
FIG. 3 is a perspective view of the fender stay shown in FIG. 1.

Referring to FIG. 3, the stay 18 can include a main body 30. The abutment surface 26 can be formed at one end of the main body 30 and a mounting hole 32 can extend through the main body 30 at an other end of the main body 30 that is opposite to the abutment surface 26. As shown in FIG. 2, the fastener assembly 24 can pass through the mounting hole 32 and through a mounting hole 13 formed in the frame member 12. The main body 30 and the fastener assembly 24 can define a load path along which a force applied to the nose 22 can be transmitted to the frame member 12 when the inner surface 28 of the nose 22 engages the abutment surface 26. The main body 30 can be sufficiently rigid to transmit the force from the nose 22 to the frame member 12 without deflection and/or deformation of the main body 30 when a person leans or pushes on the nose 22 or when an object impacts the nose 22 with a minor force.

To facilitate assembly of the stay 18 onto the frame member 12, the stay 18 can include a primary locator 42 and a secondary locator 44 to align the main body mounting hole 32 over the frame member mounting hole 13. As described in detail below, the primary and secondary locators 42, 44 can include cooperating structure on each of the stay 18 and another component of the front end 10 that has been fixed to the frame member 12 prior to the mounting of the stay 18. After the stay 18 has been positioned relative to the frame member 12 by the first and second locators, the main body mounting hole 32 can be automatically aligned with the frame member mounting hole 13 so that a threaded bolt 25 of the fastener assembly 24 can be inserted through the mounting holes 13, 32 without further adjustment by the assembler. The primary and secondary locators can be configured and dimensioned to accommodate any manufacturing tolerances so that the main body mounting hole 32 can be properly aligned with the frame member mounting hole 13 and provide the predetermined distance for the gap G.

The primary locator 42 can fix the position of the stay 18 in a transverse direction of the vehicle and in a longitudinal direction of the vehicle. In order to accomplish this fixation, the primary locator 42 can include a reference mounting hole (not viewable) formed in the frame member 12 (or another vehicle component 15 fixed relative to the frame member 12), a primary locator hole 31 formed in the stay 18, a headlight locator hole (not viewable) formed in a first headlight mounting bracket 17 of the headlight assembly 16, and a plastic locator clip 19. The primary locator hole 31 can be spaced from the main body mounting hole 32. The plastic locator clip 19 can be inserted through the primary locator hole 31, the headlight locator hole, and the reference mounting hole. The stay 18 can minimize its impact on assembly of the vehicle by sharing the reference mounting hole and the locator clip 19 with the headlight assembly 16.

The secondary locator 44 can fix the position of the stay 18 relative to the transverse direction of the vehicle. For example, the secondary locator 44 can include a secondary locator hole 34 and a reference pin 36. As shown in FIG. 3, the secondary locator hole 34 can be formed in the stay 18 at a position that is spaced from each of the main body mounting hole 32 and the primary locator hole 31. The reference pin 36 can be formed on a second headlight mounting bracket 38 of the headlight assembly 16. After the stay 18 is located relative to the frame member 12 by the primary locator, the stay 18 can be rotated about the primary locator until the secondary locator hole 34 aligns with the reference pin 36. Then, the stay 18 can be lowered relative to the second headlight mounting bracket 38 so that the reference pin 36 extends through the secondary locator hole 34, as shown in FIG. 1.

After the reference pin 36 has been inserted through the secondary locator hole 34, the main body mounting hole 32 will be aligned automatically with the mounting hole 13 (FIG. 2). Subsequently, the stay 18 can be secured to the frame member 12 by inserting the threaded bolt 25 through the mounting holes 32, 13 and then tightening with a nut 27 of the fastener assembly 24 to fix the stay 18 to the frame member 12.

Referring to FIG. 3, the stay 18 can include an arm 40 that extends from one end of the main body 30 adjacent to the abutment surface 26. The arm 40 can include a flange of the primary locator 42. The primary locator hole 31 can be formed through the flange of the primary locator 42. As shown, the primary locator 42 can be located at the end of the arm 40 that is furthest from the main body 30.

As shown, the secondary locator 44 of stay 18 can also include a flange. The flange of the secondary locator 44 can extend from an end of the main body 30 that is opposite to the end from which the arm 40 extends and from a side of the main body 30 that is opposite the side from which the arm 40 extends. The secondary locator flange can be located on the main body 30 proximate the main body mounting hole 32. The secondary locator hole 34 can be formed through the flange of the secondary locator 44.

The stay 18 can be integrally molded as a single, homogenous component from a plastic material. In an exemplary embodiment, the stay 18 can be made by injection molding a plastic material. Thus, the stay 18 can be easily manufactured and can add a minimum amount of weight to the vehicle. However, other processes, such as extrusion, casting, die molding, etc., and other materials, such as metals, ceramics, etc., can be utilized to produce the stay 18.

With reference to FIGS. 2 and 3, the main body 30 can have a cross-sectional configuration similar to an I-beam. That is, the main body 30 can include a web 46 and a peripheral wall 48 that extends around the perimeter of the web 46. The web 46 can be connected to the peripheral wall 48 intermediate the top and bottom edges of the peripheral wall 48. The majority of the web 46 can be substantially planar with an inclined portion 50 at one end. The inclined portion 50 can extend at an oblique angle relative to the substantially planar portion of the web 46. The peripheral wall 48 can extend approximately perpendicular to the substantially planar portion of the web 46. An adjacent portion 52 of the peripheral wall 48 can define the abutment surface 26 of and can extend obliquely relative to the substantially planar portion of the web 46. The adjacent portion 52 can abut and extend substantially perpendicularly from the inclined portion 50 of the web 46.

A curved portion 54 of the peripheral wall 48 can be curved to transition from the main body 30 to the arm 40. The curved portion 54 can extend along the entire junction of the arm 40 with the main body 30. In addition, the curved portion 54 can abut the inclined portion 50 of the web 46.

In the exemplary embodiment of FIGS. 2 and 3, the main body 30 includes a plurality of transverse ribs 56, 58, 60, 62, a longitudinal rib 64, and a connector rib 66. The ribs 56, 58, 60, 62, 64, 66 can increase the rigidity of the web 46. Any number of ribs and the orientation of each rib relative to the web 46, the peripheral wall 48, and each remaining rib can be varied to obtain the desired rigidity of the main body 30.

The plurality of transverse ribs 56, 58, 60, 62 can extend across the top and bottom surfaces of the web 46 and abut respective opposing locations on the peripheral wall 48 at spaced intervals as viewed in a longitudinal direction of the main body 30. Each of the transverse ribs 56, 58, 60, 62 can extend at an angle relative to the peripheral wall 48 and to each other.

As viewed in FIG. 3, the longitudinal rib 64 can extend from the first transverse rib 56 to the adjacent portion 52 of the peripheral wall 48. The longitudinal rib 64 can intersect each of the transverse ribs 56, 58, 60, 62 at a respective obtuse angle. In this embodiment, the longitudinal rib 64 is substantially linear and includes a curved portion 68. The curved portion 68 extends along the web inclined portion 50 and abuts the adjacent portion 52 of the peripheral wall 48.

The connector rib 66 can be configured to extend from the first transverse rib 56 to the second transverse rib 58. The connector rib 66 can abut the first transverse rib 56 proximate to the junction of the first transverse rib 56 with the peripheral wall 48. The connector rib 66 can also abut the second transverse rib 58 at an intersection of the longitudinal rib 64 and the second transverse rib 58. As shown in FIG. 3, the connector rib 66 can extend from the first transverse rib 56 substantially at a right angle and intersects with the second transverse rib 58 and the longitudinal rib 64 at an obtuse angle.

The main body 30 can include a plurality of drain holes 70 formed through the web 46 at spaced intervals along the web 46. The drain holes 70 permit fluid accumulated on the main body 30 during operation of the vehicle to exit from the main body 30. The drain holes 70 can be positioned in various locations depending on particular design requirements. For example, the drain holes 70 can be provided at the following locations: along each of the transverse ribs 56, 58, 60, 62, at the intersections of the longitudinal rib 64 and the transverse ribs 56, 58, 60, 62; at the intersection of the connector rib 66 and the first transverse rib 56; and, at the intersection of the connector rib 66 with the second transverse rib 58 and the longitudinal rib 64. Drain holes 70 can also be formed through the web 46 along the adjacent portion 52 of the peripheral wall 48.

The arm 40 can include an arm web 72, a pair of side walls 76, 78, and a central rib 80. The side walls 76, 78 can be configured to cooperate with the central rib 80 to increase the rigidity of the arm 40.

The arm web 72 can be integrally or otherwise connected to the curved portion 54 of the peripheral wall 48. The arm web 72 can be substantially planar with an inclined portion 74 at an end of the web that is opposite to the curved portion 54 of the peripheral wall 48. The inclined portion 74 can abut the primary locator 42.

The pair of side walls 76, 78 of this embodiment border opposite sides of the arm web 72. The side walls 76, 78 extend from the primary locator 42 to the peripheral wall 48. The first side wall 76 can be aligned with the third transverse rib 60. The second side wall 78 can abut the adjacent portion 52 of the peripheral wall 48.

The central rib 80 can extend from the primary locator 42 to the peripheral wall 48 and can extend along the inclined portion 74 of the arm web 72. The central rib 80 is aligned with the fourth transverse rib 62 in the depicted embodiment.

Figure 4:
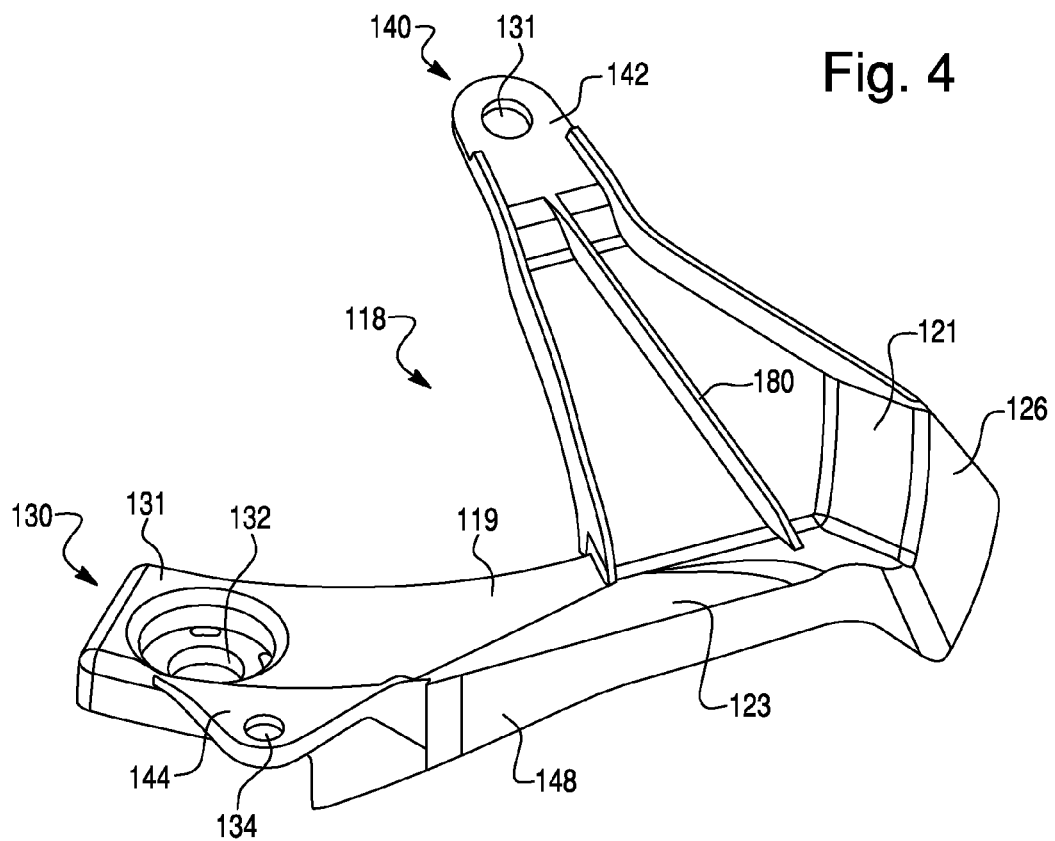
FIG. 4 is a perspective view of another example of a fender stay made in accordance with principles of the disclosed subject matter.
Figure 5:
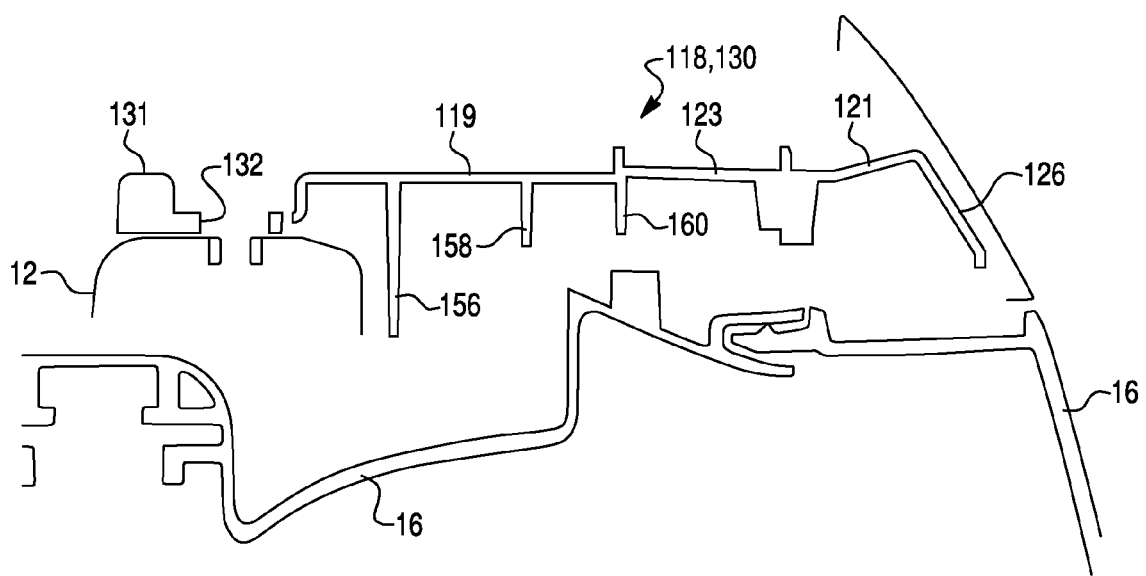
FIG. 5 is a cross-sectional view taken along line A-A of FIG. 1 with the fender stay of FIG. 4 replacing the fender stay of FIG. 1.

Referring to FIGS. 4 and 5, there is shown a fender stay 118 according to an exemplary embodiment. The fender stay 118 differs from stay 18 of FIGS. 1-3 by including substantially flush upper surfaces 119, 121, 123 to limit water trapping locations that might otherwise exist on the top of the stay. Like stay 18, the stay 118 includes a main body 130 defining a mounting hole 132 for receiving a fastener to secure the fender stay 118 to a frame member of the vehicle. As shown in FIG. 5, however, the main body includes a portion 131 adjacent the mounting hole that is increased in thickness compared to that of the stay 18. The increased thickness in this area facilitates robustness of the fender stay 118 adjacent the main attachment location for the stay 118.

In other respects, the fender stay 118 is substantially similar to stay 18 in construction and function. The fender stay 118 includes an arm 140 defining a primary locator 142 and a primary locator hole 131. The fender stay 118 includes a secondary locator 144 defining a secondary locator hole 134. Like stay 18, the fender stay 118 includes an abutment surface 126 shaped complimentary to an inner surface of the fender 14. The fender stay 118 also includes a peripheral wall 148, a central rib 180 on arm 140, and ribs 156, 158, 160 on main body 130 (see FIG. 5).

While certain embodiments of the disclosed subject matter are described above, it should be understood that the invention can be embodied and configured in many different ways without departing from the spirit and scope of the invention. For example, the stay 18 can have other cross-sectional shapes, such as a closed box or a C-channel. The stay 18 can be secured to the frame member by various other suitable structures and materials, such as, rivets, welds, adhesives, combinations thereof, etc. Additionally, other mating engagements can be used for the primary and secondary locators, such as a notch and mating projection arrangement or a detent assembly. It is also conceivable that the primary and secondary locators not be included with the stay 18. The orientation at which the stay 18 extends from the frame 12 can include a vertical component as well as a horizontal component, such that the abutment surface 26 faces upwards to some degree, if necessary. While there is one connection location and two reference locations on the stay 18 show in the drawings, it is contemplated that the number of connection locations could increase and the number of reference locations can either increase, decrease or be non-existent, depending in the desired manufacturing process.

While the subject matter has been described in detail with reference to exemplary embodiments thereof, it will be apparent to one skilled in the art that various changes can be made, and equivalents employed, without departing from the scope of the invention. All related art references discussed in the above Description of the Related Art section are hereby incorporated by reference in their entirety.

What is claimed is:

1. A front end assembly for a vehicle comprising:
   a frame member;
   a headlight assembly secured to and extending away from the frame member;
   a fender panel including,
      a main body extending along and secured to the frame member,
      a nose extending from the main body and spaced from the frame member, the nose extending along and above the headlight assembly, and
      an inner surface extending along the nose and facing the frame member; and
   a stay secured to the frame member at a position on the frame member spaced from the main body of the fender panel, the stay extending from the frame member toward the inner surface of the nose of the fender, the stay separated from the inner surface of the nose by a gap dimensioned to provide for contact between the stay and the inner surface of the nose prior to inelastic deflection of the nose,
   the stay adapted to transfer external force applied to the nose to the frame member following contact between the stay and the nose to limit deflection of the nose.

2. The front end assembly according to claim 1, wherein the stay includes an abutment surface that is spaced from the nose of the fender by the gap and is configured to contact the inner surface of the nose of the fender when a portion of the nose is deflected, the abutment surface extending substantially parallel with the inner surface of the nose of the fender.

3. The front end assembly according to claim 1, wherein the abutment surface defines a first area and the inner surface of the nose of the fender defines a second area, and the entire first area of the abutment surface extends substantially parallel to at least a portion of the second area of the inner surface, the first area being at least 5% of the second area.

4. The front end assembly according to claim 2, wherein the abutment surface is shaped complimentary to the inner surface of the nose.

5. The front end assembly according to claim 1 further comprising:
   a fastener configured to secure the stay to the frame member; and
   a primary locator spaced from the fastener and including,
      a primary reference member provided on the headlight assembly, and
      a primary locator member provided on the stay and configured to engage the primary reference member to locate the stay relative to the frame member in each of a longitudinal direction of the vehicle and a transverse direction of the vehicle.

6. The front end assembly according to claim 5, wherein the primary locator includes a locator clip,
   the primary reference member includes a reference hole formed in each of the headlight assembly and the frame member,
   the primary locator member includes a primary locator hole, and
   the locator clip extends through each of the reference hole and the primary locator hole.

7. The front end assembly according to claim 1, wherein the stay further includes,
   a stay main body that transmits the external force from the nose to the frame member when the nose engages the stay, the stay main body including,
      a first end adjacent to and spaced from the inner surface of the nose by the gap, and a second end spaced from and opposed to the first end and secured to the frame member, a primary locator member connected to the stay main body and spaced from the second end, the primary locator member engaging the headlight assembly to locate the stay relative to the frame member in each of a transverse direction of the vehicle and a longitudinal direction of the vehicle, and a secondary locator member connected to the stay main body and engaging the headlight assembly to locate the stay relative to the frame member in the transverse direction.

8. The front end assembly according to claim 7, wherein the headlight assembly includes, a first mounting bracket that includes a bracket hole, a clip that extends through the bracket hole and into the frame member to secure the first mounting bracket to the frame member, and a second mounting bracket spaced from the first mounting bracket and secured to the frame member, wherein the primary locator member includes a primary locator hole in alignment with the bracket hole and the clip extends through the primary locator hole.

9. The front end assembly according to claim 8, wherein the second mounting bracket includes a locator pin, and the secondary locator member includes a secondary locator hole engaging the locator pin.

10. The front end assembly according to claim 9, further comprising:

a fastener, wherein the frame member includes a mounting hole, the stay includes a mounting hole formed through the second end, and the fastener extends through each of the frame member mounting hole and stay mounting hole to secure the stay to the frame member.

11. The front end assembly according to claim 7, wherein the stay main body further includes, a substantially planar web, and a peripheral wall that is connected to and extends around a perimeter of the web, the peripheral wall including an abutment surface at the first end that is spaced from the inner surface of the nose by the gap and is complimentary to the inner surface of the nose, wherein each of the primary locator and the secondary locator is connected to the peripheral wall, and the abutment surface and the web define a load path along which the external force is transmitted when the nose engages the stay.

12. The front end assembly according to claim 11, wherein the stay main body further includes, a plurality of transverse ribs that extend at spaced intervals across the web and abut the peripheral wall, a longitudinal rib that extends from one of the plurality of transverse ribs to a location on the peripheral wall that forms the abutment surface, wherein the longitudinal rib intersects each of the plurality of transverse ribs, and a connector rib that extends from one of the plurality of transverse ribs to another one of the plurality of transverse ribs and abuts the longitudinal rib.

13. The front end assembly according to claim 12, wherein the stay further includes, a second web connected to the peripheral wall adjacent to the first end and the abutment surface and along one side of the stay main body, first and second side walls that extend along first and second sides of the second web, wherein the first wall is in alignment with one of the plurality of transverse ribs and the second side wall abuts the abutment surface, a central rib extends across the second web at a location intermediate the first and second side walls, the primary locator includes a primary flange connected to the second web and the primary locator hole is formed through the primary flange, the secondary locator includes a secondary flange connected to the peripheral wall adjacent the second end and on a side of the stay main body opposite to the second web, the secondary flange extending away from the peripheral wall and the substantially planar web, and the secondary locator hole is formed through the secondary flange.

14. A fender assembly for a vehicle comprising:

a fender including a main body and a nose portion, the main body secured to a frame of the vehicle, the nose portion extending from the main body along and above a headlight assembly of the vehicle; and a fender support member including an abutment surface arranged for contact with the fender nose portion when the fender nose portion is deflected under external loading, the fender support member including a main body secured to the vehicle frame at a main attachment location to transfer load applied to the fender nose portion to the vehicle frame such that deflection of the nose portion is limited.

15. The fender assembly according to claim 14, wherein the fender support member includes a primary locator and a secondary locator respectively adapted for engagement with a primary reference member and a secondary reference member for locating the fender support member with respect to the vehicle frame, each of the reference members located on either one of the headlight assembly and the vehicle frame, the fender support member arranged such that a majority of the external loading applied to the fender support member is transferred from the fender support member to the vehicle frame at the main attachment location such that transfer of loading from the fender support member to the headlight assembly is limited.

16. The fender assembly according to claim 15, wherein the primary locator of the fender support member includes a locator clip adapted for receipt by a reference hole defined by the headlight assembly.

17. The fender assembly according to claim 14, wherein the fender and the support member are arranged such that a gap is defined between the support member and the fender nose portion when the fender nose portion is in an unloaded condition, the gap providing for a limited amount of deflection of the fender nose portion before externally applied loading is transferred from the fender support member to the vehicle frame.

18. A method for assembling a front end of a vehicle comprising:

providing a frame, a fender that includes a main portion and a nose portion that extends from the main portion, a headlight assembly, and a stay that includes an abutment surface;

securing the main portion of the fender to the frame such that the nose portion of the fender is spaced from the frame by a distance;

connecting the headlight assembly to the frame such that the headlight assembly extends along and below the nose portion of the fender;

spacing the abutment surface of the stay from the nose of the fender by a gap distance that is substantially less than the distance from the nose of the fender to the frame; and securing the stay to the frame member such that the abutment surface of the stay is spaced from the nose of the fender by the gap distance.

19. The method according to claim 18, wherein spacing the abutment surface of the stay further includes aligning the stay relative to the frame using the headlight assembly as a reference.

20. The method according to claim 19, wherein aligning the stay includes, providing the headlight assembly with a primary reference member and a secondary reference member, providing the stay with a primary locator member and a secondary locator member, engaging the primary reference member with the primary locator member, engaging the secondary reference member with the secondary locator member when the primary locator member engages the primary reference member, and securing the stay includes, tightening a fastener to each of the stay and the frame when the secondary locator engages the secondary reference member.

* * * * *